W. & W. H. Lewis,
Photographic Plate-Holder.
Nº 19252. Patented Feb. 2, 1858.
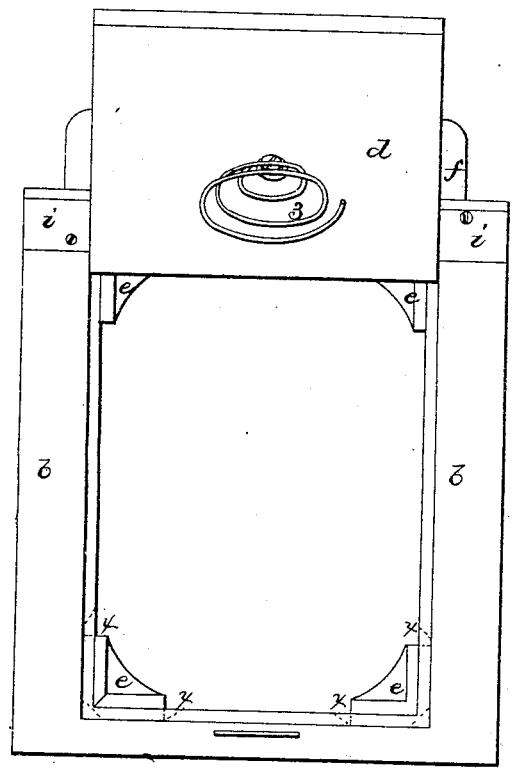
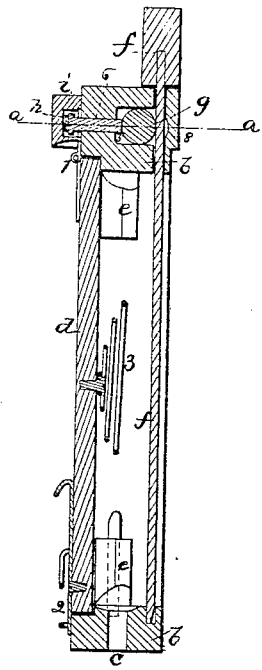
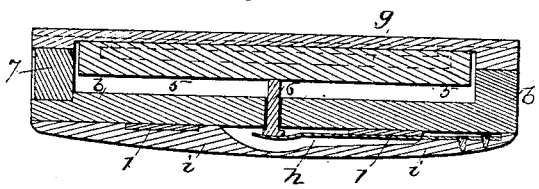
Witnesses;
Lemuel W. Serrell
Thomas G. Harold
Inventors;
Willm Lewis
W. H. Lewis

UNITED STATES PATENT OFFICE.

WILLM. LEWIS AND W. H. LEWIS, OF NEW YORK, N. Y.

PLATE-FRAME FOR PHOTOGRAPHIC CAMERAS.

Specification of Letters Patent No. 19,252, dated February 2, 1858.

*To all whom it may concern:*

Be it known that we, WILLIAM LEWIS and WILLIAM H. LEWIS, of the city and State of New York, have invented, made, and applied to use certain new and useful Improvements in Frames for Photographic Cameras; and we do hereby declare that the following is a full, clear, and exact description of the construction and operation of the same, reference being had to the annexed drawing, making part of this specification, wherein—

Figure 1, is an elevation of the back of the frame as opened for receiving a plate. Fig. 2, is a vertical section of said frame, and Fig. 3, is a sectional plan at the line *a, a,* of Fig. 2.

Similar marks of reference indicate the same parts.

In frames for taking photographic pictures in cameras a slide is made use of which excludes all light from the glass or other plate contained in said frame, which glass is prepared with the proper chemical substances. The aforesaid slide is drawn out from in front of the glass or plate, for the taking of the picture, and afterward again inserted before the frame is removed from the camera. In this operation there is an opening left through which the said slide is withdrawn, and to prevent the light striking down through said opening it is necessary that some device should occupy said opening and cut off the rays of light. For this purpose strips of metal have been used, hinged on one edge and kept up by a spring, but the same are influenced by the chemical substances that accumulate from the slide, and said slide is scraped by said metallic strip as the slide is moved, and often becomes obstructed in its operation and cannot easily be cleaned.

The nature of our said invention consists in the use of a strip or bar of glass or other vitrified substance in combination with a spring, in such a manner that said strip or bar will spring into the opening and cut off rays of light when the slide is withdrawn, and so that said "cut off" can be removed from the frame for cleaning. We also attach to our frame corners of glass or similar substance in a peculiar manner so as to hold the same firmly in place; said corners receiving the surface and edges of the glass or other photographic plate in the manner set forth in our patent of October 7th 1856.

In the drawing, *b, b,* is the frame, of a size adapted to the camera, in the bottom of which a hole may be provided as at *c,* for any drippings from the plate to pass away.

*d* is the back plate of the frame on hinges 1, 1, and kept shut by the latch 2.

3, is the spring to keep the glass or other photographic plate to the glass or equivalent corners *e, e*. These corners are formed each of one solid piece as shown in our before mentioned patent, and are provided with ribs 4, 4, as shown in the detached Fig. 4, and in order to secure these corners in place we form a groove of the proper size in each angle of the frame, and insert the ribs 4, 4, into said grooves, and by filling in the grooves at the ends of the ribs with putty or suitable cement (as at *x,* Fig. 1,) the corner is permanently held in place. By this manner of attachment the glass corners are secured in place by a cement that cannot itself come in contact with the photographic plate, and cannot become broken and allow the corner to move. And this manner of attaching the corner by a rib cemented into the frame may be used with any desired character of glass or vitrified corner.

*f* is the slide passing down in grooves in the frame *b,* and excluding light from the photographic plate.

*g* is our bar or cut off formed of glass or equivalent material that will not become corroded with the chemicals that may come in contact with the same. This cut off is within a chamber or cavity 5 and is pressed to the slide by a spring *h,* see Fig. 3, acting on a pin 6, passing through the said frame. The spring *h,* is inclosed by a strip *i,* to prevent any chemicals coming in contact with said spring, and injuring the same, from either the inside or the outside, and a cork or similar stopper 7 is inserted at the end of the cavity or chamber 5, by the withdrawal of which the cut off *g* can be removed and cleaned.

The cut off *g,* requires to be opaque, that is to say should be of black glass or equivalent vitrified material that will not be acted on by the chemicals, and a slight recess at 8, insures the perfect exclusion of the light.

What we claim as our invention and desire to secure by Letters Patent is—

1. The cut off $g$, of opaque glass or equivalent material in combination with a suitable spring, by which said cut off is made to close the aperture through which the slide passes, substantially as, and for the purposes specified.

2. We also claim securing the corners $e$ of glass or equivalent material, into the frame, by means of the rib and groove substantially as specified.

In witness whereof we have hereunto set our signatures this fourteenth day of January 1858.

WILLM. LEWIS.
W. H. LEWIS.

Witnesses:
LEMUEL W. SERRELL,
THOMAS G. HAROLD.